Patented Feb. 12, 1924.

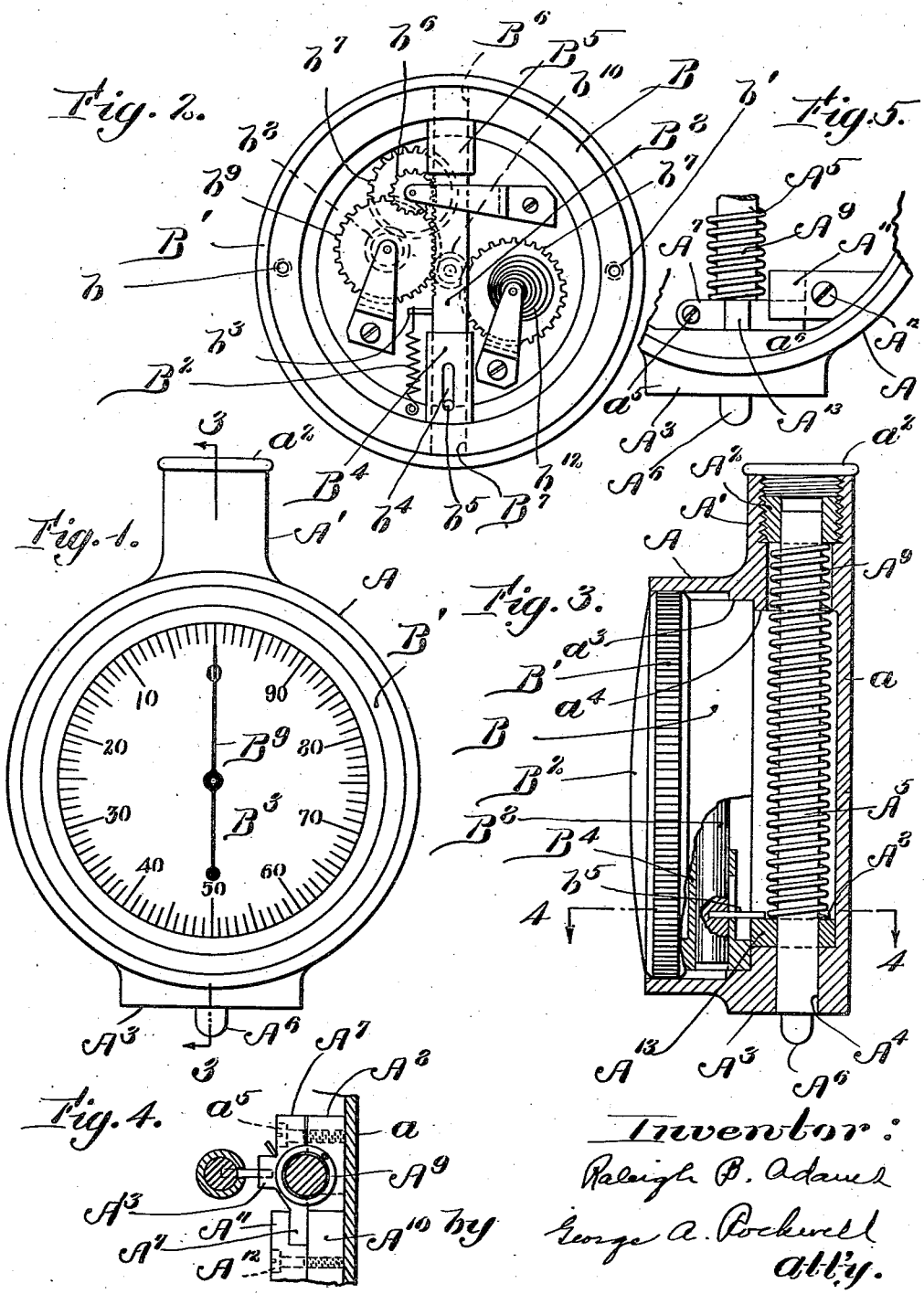

1,483,565

UNITED STATES PATENT OFFICE.

RALEIGH B. ADAMS, OF NEWTON, MASSACHUSETTS, ASSIGNOR TO STOWE & WOODWARD COMPANY, OF NEWTON UPPER FALLS, MASSACHUSETTS, A CORPORATION OF MASSACHUSETTS.

DEVICE FOR TESTING HARDNESS.

Application filed December 9, 1922. Serial No. 605,957.

*To all whom it may concern:*

Be it known that I, RALEIGH B. ADAMS, of Newton, in the county of Middlesex and State of Massachusetts, have invented a new and useful Device for Testing Hardness, of which the following is a specification.

The principal object of my invention is to provide a portable device for testing the hardness of rubber and particularly rubber covered rolls.

A feature of my invention is that it is a compact and complete portable entity ready for direct testing wherever desired.

Another feature is that it comprises an external substantially flat surface to engage the material to be tested combined with a relatively hard nose movable with relation to said surface to enter said material and through connecting mechanism indicate the hardness of the material.

Other features will be pointed out below.

In the drawings—

Figure 1 is a front elevation of a device embodying my invention;

Figure 2 is a rear elevation of the base, the casing being removed;

Figure 3 is a vertical sectional elevation on the line 3—3 of Figure 1;

Figure 4 is a partial section on the line 4—4 of Figure 3; and

Figure 5 is a fragmentary elevation of the casing.

Casing A is cylindrical, being open at the front and having back wall $a$, the latter being provided with openings (not shown) for the shanks of attaching screws. Annular shoulders $a^3$ and $a^4$ are provided for cooperation with the base as described below. Integral with the casing is neck $A'$ internally threaded to engage the external threading of hollow bearing member $A^2$ and also to engage the external threading of cap $a^2$. At one external portion of the bottom of the casing I provide a flat metal shelf or abutment $A^3$ perforated at $A^4$, this perforation extending inwardly through the wall of the casing, said perforation and the member $A^2$ providing bearings for steel spindle $A^5$, which has a hemispherical hardened nose or point $A^6$ to press the material to be tested. Jaws $A^7$ and $A^8$ are clamped to the spindle by screw $a^5$ and form a lower abutment for spring $A^9$ which is coiled around the spindle and at its upper end abuts against the bottom of member $A^2$, and tends to force jaws $A^7$ and $A^8$ against flat portion $a^6$ of the casing. Casing A has an integral projection $A^{10}$ to which is attached guide member $A^{11}$ by means of screw $A^{12}$, a portion of member $A^{11}$ being spaced from projection $A^{10}$ to form a guide way for jaw $A^7$, the latter being provided with a shoulder $A^{13}$ to engage the indicator operating mechanism as more fully described below.

Base B is cylindrical and fits within the casing being held thereto by screws whose shanks pass through the opening above referred to in the back wall $a$ and whose threading engage the threaded holes $b$ and $b'$ in the base. The base may have a knurled member $B'$ crimped to hold in place the glass $B^2$ and dial $B^3$. The base is provided with internally projecting tubular guides $B^4$ and $B^5$ and aligned openings $B^6$ and $B^7$, this construction being to permit movement of, and to guide rack bar $B^8$ which is held normally in its lower position by spring $b^2$ connected at one end to the base and at the other end to pin $b^3$ fixed to the rack bar which may be flat intermediate of its ends. Guide $B^5$ has a slot $b^4$ to permit, and limit, movement of pin $b^5$ fixed to the rack bar, said pin normally engaging the top of shoulder $A^{13}$, so that when said shoulder is raised the rack bar will be raised and rotate pinion $b^6$, upon whose shaft is fixed gear $b^7$, the latter operating pinion $b^8$, upon whose shaft is fixed gear $b^9$, the latter operating pinion $b^{10}$, upon whose shaft is fixed pointer $B^9$. I also provide gear $b^{11}$ which engages pinion $b^{10}$ and which, under the influence of spring $b^{12}$, tends to return the pointer to normal position.

When my device is applied to the material to be tested, as, for example, to the surface of a rubber roll the nose $A^6$ is pressed into the material until the latter is just tangent to the flat surface $A^3$, the movement of said nose inwardly of the casing being resisted by the compression spring $A^9$. The force exerted by said spring is predetermined and the size of said nose is predetermined and the relation of said force and size are preferably such that when said tangency occurs the reading of the indicator dial will show the number of 50ths of a millimeter that a steel ball ⅛ of an inch in diameter would penetrate the rubber if it were forced into the rubber by a force equal to the weight of one kilogram.

The compression of spring $A^9$ may be readily adjusted by adjustment of the jaws $A^7$ and $A^8$ and I have at all times a portable and extremely accurate instrument for measuring the hardness of rubber or other material.

An important advantage of my instrument is that it can be made in quantities so that all instruments will register alike for a given hardness and the hardness expressed by the dial reading is comparable with a recognized standard. The standard commonly used in the rubber roll industry is based on the number of hundredths of a millimeter a steel ball $\frac{1}{4}''$ in diameter will penetrate under the force equal to the weight of one kilogram. The hardness of any piece of rubber tested by my instrument will therefore be one-half the reading which would be found by the standard plastometer.

It will be clear that my device is a convenient portable shop instrument by means of which a roll can be tested in the machine in which it is operating and my instrument is therefore a valuable scientific tool.

What I claim is:

1. A device of the character described comprising a casing having an abutment to engage the material to be tested; a spindle mounted to move inwardly with reference to said casing when pressed by the material, said spindle having an end to engage the material; a spring tending to resist the inward movement of the spindle, the size of said end and the resistance of said spring having a predetermined relation when the material engages said abutment; means to adjust the compression of said spring; and means operatively connected with said spindle to indicate the hardness of the material.

2. A device for testing the hardness of rubber rolls comprising a casing having a flat, external, abutment surface to engage the material to be tested; a spindle having a substantially hemispherical end normally projecting beyond said surface, said spindle being mounted to move inwardly with reference to said casing when said end is pressed by the material; a compression spring tending to resist the inward movement of the spindle, the size and shape of said end and the resistance of said spring having a predetermined relation when the material engages said abutment; means to adjust the compression of said spring; and means operatively connected with said spindle to indicate the hardness of the material.

RALEIGH B. ADAMS.